US009219670B2

(12) United States Patent
Aluru et al.

(10) Patent No.: US 9,219,670 B2
(45) Date of Patent: Dec. 22, 2015

(54) LINK-AWARE THROUGHPUT ACCELERATION PROFILES

(75) Inventors: Sravanth Aluru, Andhra Pradesh (IN); Rajesh Rana, Himachal Pradesh (IN); Laxmi Narasimha Rao Oruganti, Andhra Pradesh (IN)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 1412 days.

(21) Appl. No.: 11/702,411

(22) Filed: Feb. 5, 2007

(65) Prior Publication Data

US 2008/0186847 A1 Aug. 7, 2008

(51) Int. Cl.
*H04L 12/26* (2006.01)
*H04L 12/24* (2006.01)

(52) U.S. Cl.
CPC ......... *H04L 43/0888* (2013.01); *H04L 41/5012* (2013.01); *H04L 41/5077* (2013.01)

(58) Field of Classification Search
USPC ............................ 709/227–229; 370/230–235
See application file for complete search history.

(56) References Cited

U.S. PATENT DOCUMENTS

| | | | |
|---|---|---|---|
| 5,613,090 A | 3/1997 | Willems | |
| 5,946,634 A * | 8/1999 | Korpela | ...................... 455/552.1 |
| 5,991,771 A | 11/1999 | Falls et al. | |
| 6,717,915 B1 * | 4/2004 | Liao et al. | ...................... 370/252 |
| 6,782,422 B1 | 8/2004 | Bahl et al. | |
| 2002/0116545 A1 | 8/2002 | Mandato et al. | |
| 2004/0151153 A1 | 8/2004 | Henry et al. | |
| 2004/0255044 A1 | 12/2004 | Bergek | |
| 2005/0041581 A1 * | 2/2005 | Kuusinen et al. | .............. 370/230 |
| 2005/0141706 A1 | 6/2005 | Regli et al. | |
| 2005/0232153 A1 | 10/2005 | Bishop et al. | |
| 2006/0039354 A1 | 2/2006 | Rao et al. | |

FOREIGN PATENT DOCUMENTS

| | | |
|---|---|---|
| WO | WO0128160 A2 | 4/2001 |
| WO | WO 2006058257 A2 * | 6/2006 |

OTHER PUBLICATIONS

ATCP: TCP for mobile ad hoc networks authored by Liu et al (IEEE Journal, Aug. 7, 2002).*
Chrysostomou, et al., "Fuzzy Logic Congestion Control in TCP/IP Best-Effort Networks", http://atnac2003.atcrc.com/POSTERS/chrysostomou.pdf.
Feng, et al., "A self-configuring RED gateway", Date: 1999, http://ieeexplore.ieee.org/iel4/6063/16232/00752150.pdf?isNumber=.

(Continued)

*Primary Examiner* — Thai Nguyen
(74) *Attorney, Agent, or Firm* — Brian Haslam; Kate Drakos; Micky Minhas (57) ABSTRACT

An arrangement is provided for exposing TCP/IP profiles to a client application operating in a mobile computing environment where each profile comprises a set of TCP/IP configuration parameters that are mapped to a specific network type. An application programming interface ("API") enables the client application to propagate configuration parameters in a selected TCP/IP profile to a TCP/IP layer in a communication protocol stack that resides on a mobile device. The TCP/IP configuration parameters are applied to data communications with a remote terminal over a network that is comprised of several links and which typically includes a wireless link.

20 Claims, 5 Drawing Sheets

(56) References Cited

OTHER PUBLICATIONS

Fu, et al., "TCP Veno: TCP Enhancement for Transmission over Wireless Access. Networks", Date: Feb. 2003, vol. 21, No. 2, http://www.ntu.edu.sg/home5/ZHOU0022/papers/CPFu03a.pdf.

Satyanarayanan, et al., "Application-Aware Adaptation for Mobile Computing", http://citeseer.ist.psu.edu/cache/papers/cs/3331/http:zSzzSzwww.eecs.umich.eduzSz~bnoblezSzpaperszSzdagstuhl94.pdf/application-aware-adaptation-for.pdf.

\* cited by examiner

LINK-AWARE THROUGHPUT ACCELERATION PROFILES

BACKGROUND

Wireless networks, such as GPRS/EDGE (General Packet Radio Services/Enhanced Data rates for GSM Evolution), supporting mobile devices typically use a radio link that provides a reliable delivery mechanism for data packets. Such reliable delivery is provided even in the presence of impairments that may occur, for example, as a result of handoffs across base stations or when a mobile device is moved through a tunnel. The GPRS/EDGE radio link ensures the integrity of received data through the implementation of two reliable modes of operation: RLC (radio link control) acknowledged and LLC (logical link control) acknowledged mode operations. The RLC acknowledged mode is typically used by default to ensure that the data received by/from the mobile device is without error. LLC acknowledged mode is typically an optionally utilized feature. This protocol ensures that all LLC frames are received without error by verifying a checksum for each LLC frame. In case the checksum fails, the frame is discarded. Unacknowledged packets are then retransmitted and correct receipt of all LLC frames must be acknowledged. Due to impairments, RLC segments retransmission is expected which can propagate into delays in assembly of the LLC frames and IP (Internet Protocol) segments.

At a receiving terminal device, TCP/IP (Transport Control Protocol/internet Protocol) layer in a communication protocol stack disposed in the terminal requires that all RLC frames in an LLC frame, and all LLC frames, be received for assembling an IP segment before sending an acknowledgement to the mobile device. As a result of this flow control managed at the TCP/IP layers, it is possible for assembly delay of an IP segment at the lower RLC/LLC layers to cause TCP/IP to back off on the transmission data rate and attempt retransmission of packets it believes have been lost. Such slow down of transmission can eventually lead to significant end-to-end network performance degradation.

This Background is provided to introduce a brief context for the Summary and Detailed Description that follow. This Background is not intended to be an aid in determining the scope of the claimed subject matter nor to be viewed as limiting the claimed subject matter to implementations that solve any or all of the disadvantages or problems presented above.

SUMMARY

An arrangement is provided for exposing TCP/IP profiles to a client application operating in a mobile computing environment where each profile comprises a set of TCP/IP configuration parameters that are mapped to a specific network type. An application programming interface ("API") enables the client application to propagate configuration parameters in a selected TCP/IP profile to a TCP/IP layer in a communication protocol stack that resides on a mobile device. The TCP/IP configuration parameters are applied to data communications with a remote terminal over a network that is comprised of several links, and which typically include a wireless link.

In various illustrative examples, the TCP/IP configuration parameters include values for connection timeout, send timeout, and receive timeout. The timeout values are each configured to at least be greater than the average propagation delay in the wireless link which reduces the TCP/IP connection handshake and retransmission overheads. Data throughput is substantially accelerated using the present TCP/IP profiles. In addition, client applications may be arranged with link-awareness to thereby enhance data transmission performance through the application of a TCP/IP profile to the TCP/IP layer exposed by the API. A client application may switch network connections and apply a new TCP/IP profile to enhance the performance of the new connection. Client applications include, for example, small footprint databases which run on a mobile device host that occasionally need to synchronize with a remote terminal to send and receive updates or changes, or replicate a copy of a remote database on the mobile device.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

DETAILED DESCRIPTION

TCP/IP is one of the most widely used transport protocols for non-real-time Internet applications like web-browsing, file transfer and email. It provides a connection-oriented end-to-end service ensuring reliable data transfer. TCP/IP implements flow control in the Internet to avoid congestion. This is achieved by various mechanisms, including slow start and congestion avoidance, that work to achieve as high a data throughput rate as possible, but which then back off as soon as congestion occurs.

One application that has influenced protocol refinements is the World Wide Web on the Internet, which uses HTTP (Hypertext Transfer Protocol) running over TCP/IP. The wide use of the Web and Internet has emphasized the need to enhance HTTP performance. Persistent-connection support, recently standardized in HTTP/1.1, allows HTTP to re-use a single TCP/IP connection across multiple transactions to the same terminal device or server.

The radio link used in wireless mobile data environments suffers from time-varying characteristics, shadowing, interference and relatively high bit error rates which can lead to packet loss and delays resulting in TCP/IP timeouts. However, the root cause for the loss and delays is not network congestion but rather impairments on the radio link itself. Accordingly, the interaction between the protocol layers supporting wireless mobile data transmission, for example those used in a GPRS network, can negatively interact with the TCP/IP layer which supports data communication over the Internet portion of a network.

Figure 1:
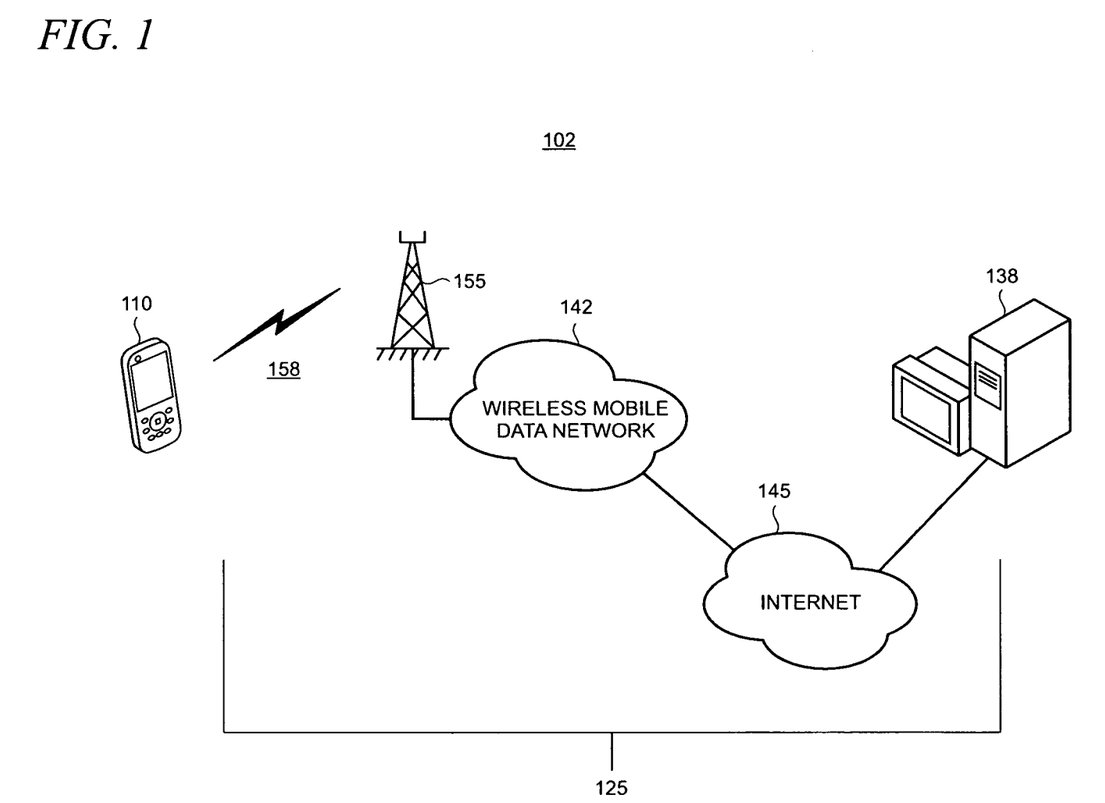
FIG. 1 is a first illustrative network topology for a wireless mobile data network environment showing a mobile device, a network comprising multiple links, and a remote terminal.

Turning now to the drawings where like reference numerals indicate like elements, FIG. 1 is a first illustrative network topology 102 for a wireless mobile data network environment showing a mobile host device 110, a network 125 comprising multiple links, and a remote terminal 138. The mobile host device 110 is representative of the portable electronic devices currently available that support wireless data connectivity. Accordingly mobile host device 110 may be selected from one of mobile phone, PDA (personal digital assistant), smart phone, personal computer ("PC"), pocket PC, laptop computer, tablet PC, portable media player, game console, or portable game device, as required by a specific application of link-aware throughput acceleration profiles.

Network 125 is utilized to provide end-to-end connectivity between mobile host device 110 and the remote terminal 138. In this illustrative example, remote terminal 138 is a server that is arranged to host a database. Network 125 typically comprises several links. As shown in FIG. 1, network 125 includes a wireless mobile data network link 142 and an Internet network link 145. Mobile host device 110 communicates wirelessly with the mobile data network link 142 through a base station 155 as indicated by arrow 158.

Wireless mobile data network 142 is arranged using one of a variety of alternative wireless network protocols including, for example, GPRS, EDGE, HSDPA (High-Speed Downlink Packet Access), or UMTS (Universal Mobile Telecommunications System). In other alternative arrangements, a wireless networking protocol conforming to the Institute of Electrical and Electronics Engineers IEEE 802.11 (also known as "Wi-Fi") or wireless Ethernet is usable. Traditional wired networking protocols including dial-up networking over telephone lines and wired Ethernet may also be used in some applications of link-aware throughput acceleration profiles.

Figure 2:
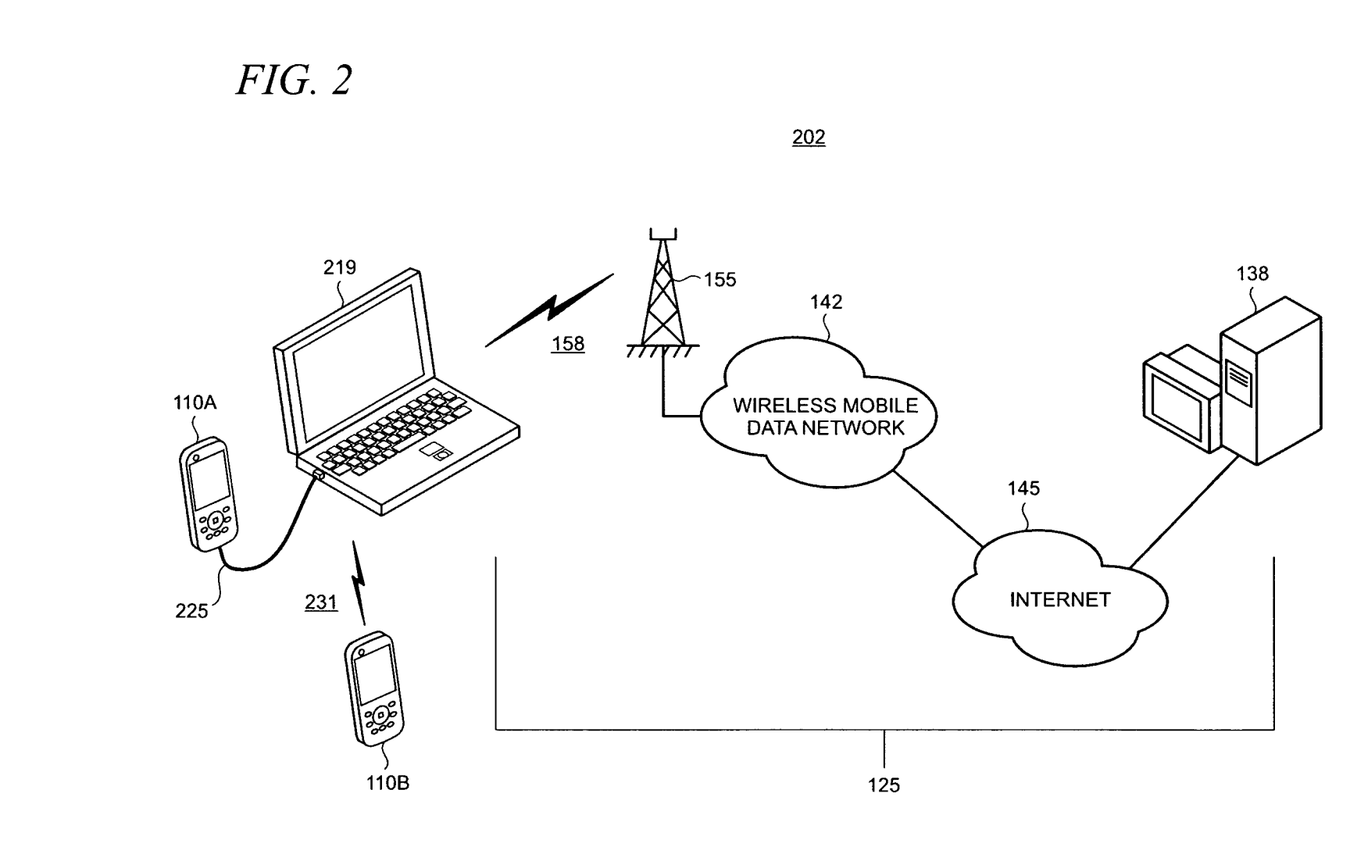
FIG. 2 is a second illustrative network topology for a wireless mobile data network environment showing a mobile device coupled to a gateway, a network comprising multiple links, and a remote terminal.

FIG. 2 is a second illustrative network topology 202 for a wireless mobile data network environment showing the mobile host device 110 coupled to a gateway 219. Gateway 219 functions as an intermediary to provide connectivity between the mobile host device 110 and wireless mobile data network 142. Gateway 219 is a laptop computer with a wireless GPRS network access card (not shown) that interfaces with the laptop's PCM/CIA (Personal Computer Memory/Card International Association) or PC Card slot. A cable 225 such as Universal Serial Bus ("USB") cable may be used to couple the gateway 219 to the mobile host device (as indicated by reference numeral 110A). Alternatively, a short range wireless protocol such as a Bluetooth link 231 is used to couple the gateway 219 to the mobile host device (as indicated by reference numeral 110B).

Figure 3:
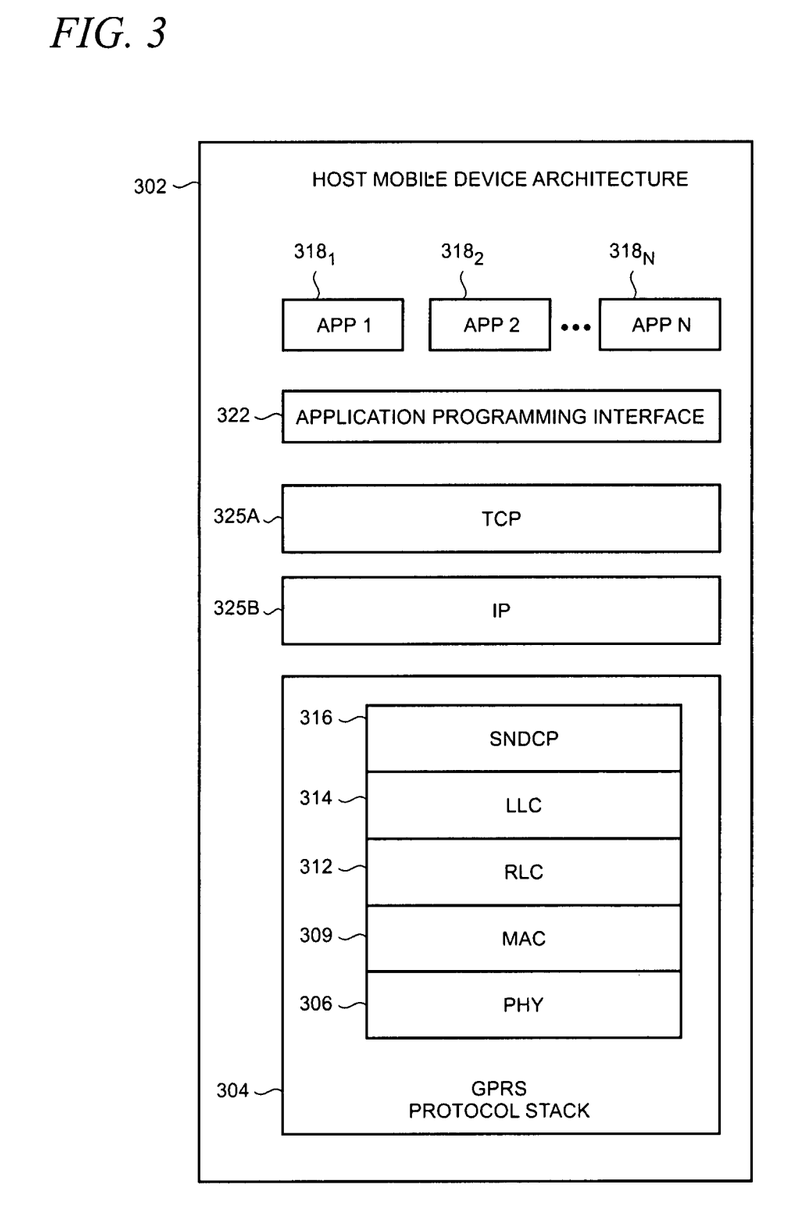
FIG. 3 is a simplified diagram of an illustrative architecture for a host mobile device.

FIG. 3 is a simplified diagram of an illustrative architecture 302 for the host mobile device 110 shown in FIGS. 1 and 2. Architecture 302 includes a number of abstracted logical objects that are typically implemented in software, firmware, or a combination of software and firmware that is resident on the host mobile device 110. A GPRS protocol stack 304 is utilized in architecture 302 to provide the reliable data transfer using the RLC and LLC acknowledged modes noted above. GPRS protocol stack 304 includes a physical layer 306, MAC (media access control) layer 309, RLC layer 312, LLC layer 314, and an SNDCP (Sub Network Dependent Convergence Protocol) layer 316, as shown.

A number of client applications $318_{1-N}$ are typically hosted by host mobile device 110 including, for example, communication applications to support voice and data communications, email applications, web-browsers, etc. A small footprint database is also supported by the host mobile device 110 that is designed to work in a mobile environment where resources are typically limited.

An application programming interface 322 ("API") is arranged as an intermediary between the applications 318 and the TCP layer 325A and IP layer 325B (collectively referred to as TCP/IP layer 325). The API 322 exposes TCP/IP parameters to the applications 318. The TCP/IP parameters are applied by the TCP/IP layer 325 to manage a communication session between the mobile host device 110 and remote terminal 138 over network 125 (FIG. 1). In this illustrative example, the TCP/IP parameters include timeouts including a connect timeout, a send timeout, and a receive timeout.

The connect timeout value is set or retrieved (for example from a library of stored parameter values) when an application 318 invokes a method INTERNET_OPTION_CONNECT_TIMEOUT which sets or retrieves an unsigned long integer value that contains the timeout value (in milliseconds) for Internet connection requests. If the connection request takes longer than this timeout value, the request is canceled. When attempting to connect to multiple IP addresses for a single host (referred to as a "multihomed" host that has more than one connection to a network), the timeout limit is cumulative for all of the IP addresses.

The send timeout value is set or retrieved when an application 318 invokes a method INTERNET_OPTION_SEND_TIMEOUT (or alternatively, INTERNET_OPTION_DATA_SEND_TIMEOUT or INTERNET_OPTION_CONTROL_SEND_TIMEOUT) which sets or retrieves an unsigned long integer value, in milliseconds, that contains the timeout value to send a request. If the send takes longer than this timeout value, the send is canceled.

The receive timeout value is set or retrieved when an application 318 invokes a method INTERNET_OPTION_RECEIVE_TIMEOUT (or alternatively, INTERNET_OPTION_DATA_RECEIVE_TIMEOUT or INTERNET_OPTION_CONTROL_RECEIVE_TIMEOUT) which sets or retrieves an unsigned long integer value that contains the timeout value, in milliseconds, to receive a response to a request. If the response takes longer than this timeout value, the request is canceled.

Table 1 below provides three sets of exemplary timeout values for both an HTTP connection retry timeout and the TCP/IP parameters discussed above. Each set of timeout values is mapped to a specific network type including high, medium, and low bandwidth networks (for which examples are given for each type). The values provided in Table 1 have been empirically shown to accelerate data throughput over mobile wireless data networks by as much as 25-35%. The values are generally selected to ensure that the timeouts exceed the average propagation latency for transmission over a wireless network link. However, it is emphasized that the specific values selected may be subject to some variability due to conditions and impairments found in a specific link or network. Accordingly, an actual optimum value for a particular application of link-aware acceleration profiles may lie within a range (e.g., ±10%) of the nominal values shown in Table 1.

TABLE 1

| Network Type | Timeout Values | |
| --- | --- | --- |
| High Bandwidth Networks (e.g., Ethernet and USB) | HTTP connection retry timeout | 30 s |
| | TCP/IP connect timeout | 3000 ms |
| | TCP/IP send timeout | 1000 ms |
| | TCP/IP receive timeout | 1000 ms |

TABLE 1-continued

| Network Type | Timeout Values | |
|---|---|---|
| Medium Bandwidth Networks (e.g., IEEE 802.11 wireless) | HTTP connection retry timeout | 60 s |
| | TCP/IP connect timeout | 6000 ms |
| | TCP/IP send timeout | 3000 ms |
| | TCP/IP receive timeout | 3000 ms |
| Low Bandwidth Networks (e.g., mobile data networks and dial-up) | HTTP connection retry timeout | 120 s |
| | TCP/IP connect timeout | 12000 ms |
| | TCP/IP send timeout | 6000 ms |
| | TCP/IP receive timeout | 6000 ms |

Figure 4:
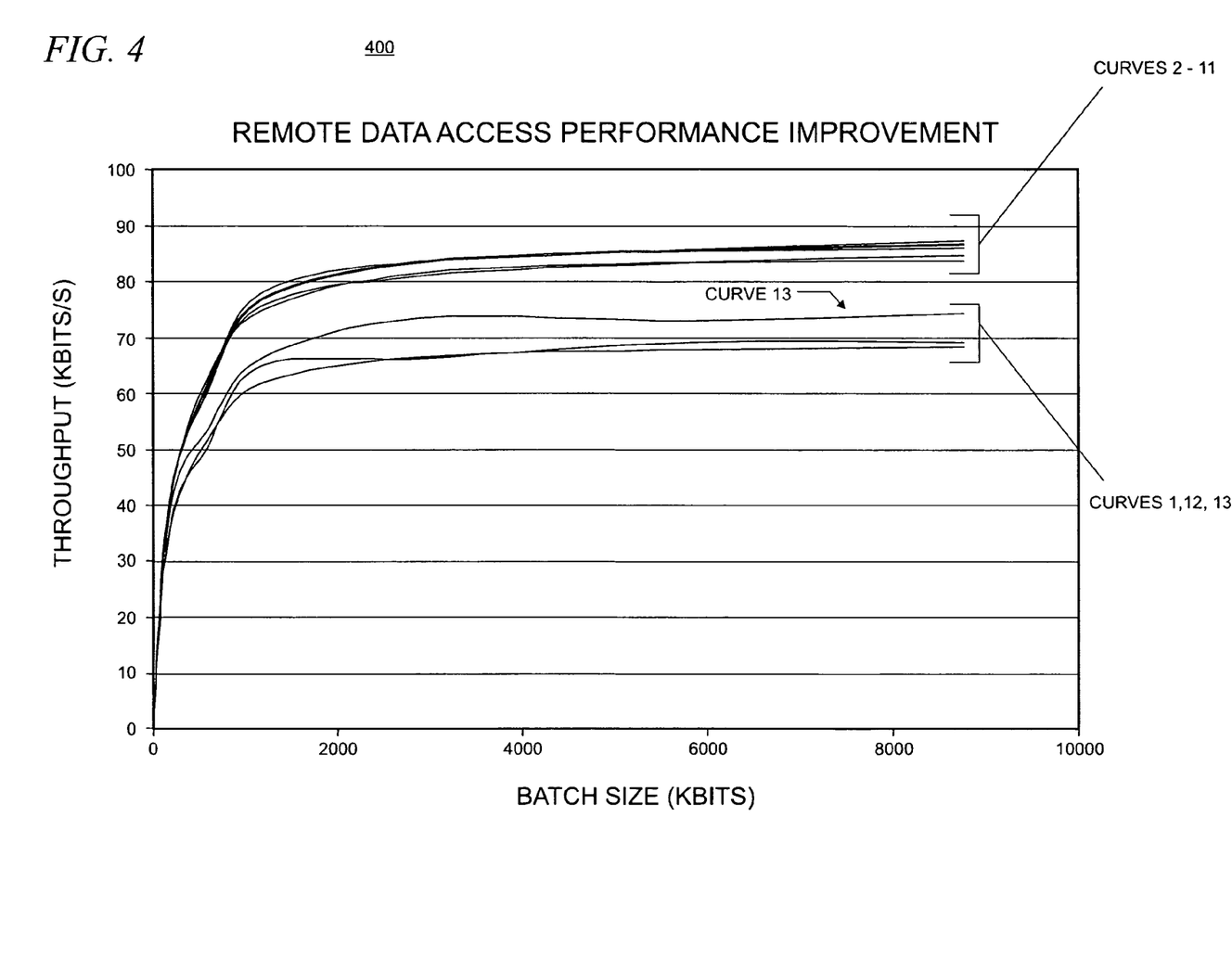
FIG. 4 is a graph showing remote data access throughput as a function of data batch size for a fixed HTTP (Hypertext Transfer Protocol) connection retry timeout value of 120 seconds with varying TCP/IP send and receive timeout values.

FIG. 4 is a graph 400 showing remote data access throughput as a function of data batch size for a fixed HTTP connection retry timeout value of 120 seconds with varying TCP/IP send and receive timeout values. Fourteen curves are plotted in FIG. 4 corresponding to the timeout values shown in Table 2 below.

TABLE 2

| Curve No. | Send Timeout Value | Receive Timeout Value |
|---|---|---|
| 1 | None | None |
| 2 | 2 s | 2 s |
| 3 | 3 s | 3 s |
| 4 | 4 s | 4 s |
| 5 | 5 s | 5 s |
| 6 | 7 s | 7 s |
| 7 | 10 s | 10 s |
| 8 | 20 s | 20 s |
| 9 | 50 s | 50 s |
| 10 | 100 s | 100 s |
| 11 | 360 s | 360 s |
| 12 | 400 ms | 400 ms |
| 13 | 700 ms | 700 ms |
| 14 | 1 s | 1 s |

As shown in FIG. 4, the fourteen curves fall essentially into two groups: curves 2-11 are positioned noticeably above curves 1, 12, and 13. Curve 13 is specifically indicated in FIG. 4 as being positioned somewhat between the upper curves and the remaining curves 1 and 12 in the lower group.

Figure 5:
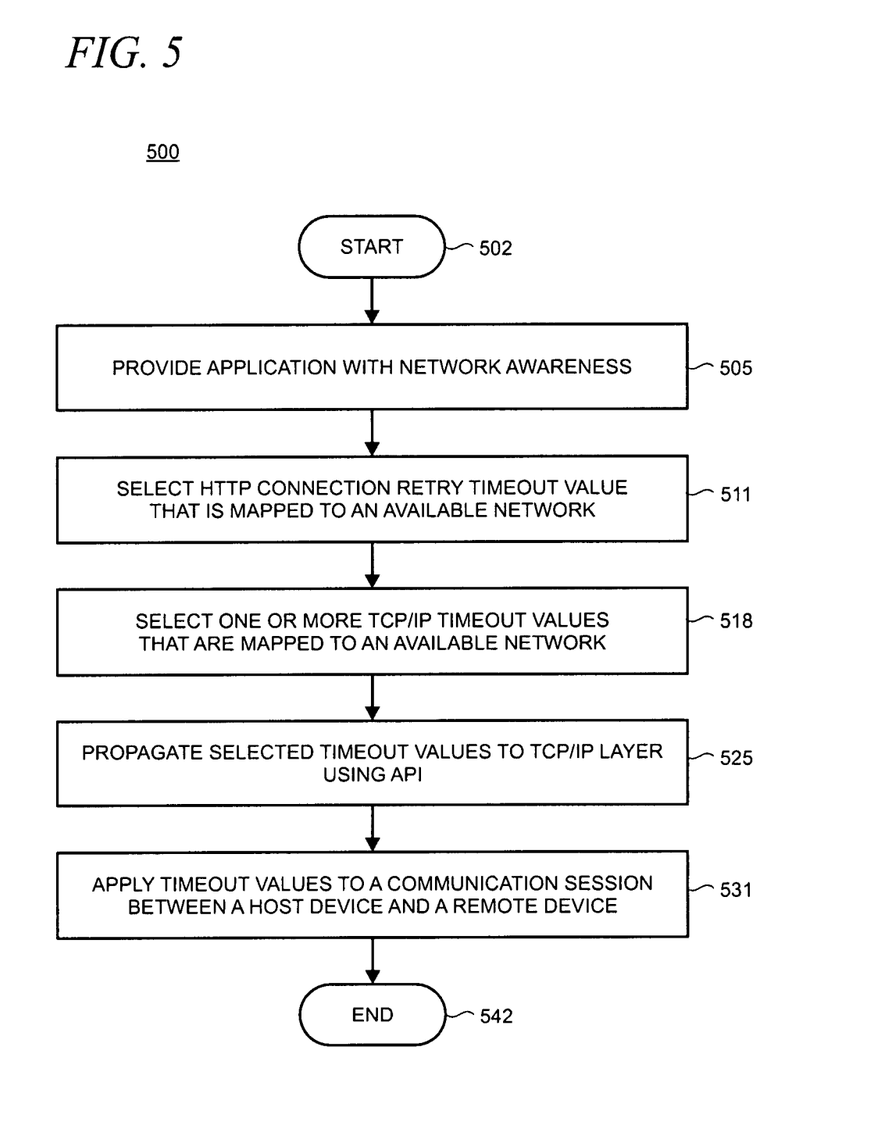
FIG. 5 is a flowchart of an illustrative method for enhancing data throughput from a link-aware client application running in a wireless mobile data network environment.

FIG. 5 is a flowchart of an illustrative method 500 for enhancing data throughput from a link-aware client application running in a wireless mobile data network environment. The method starts at block 502. At block 505, the application is provided with network awareness (i.e., determines the availability of a network). The application may become aware of and adapt to changing network connectivity scenarios in the environment by performing a query and/or being notified of changes to network connectivity and network capabilities. At block 511, an HTTP connection retry timeout value is selected. In this illustrative example, the value is pulled from a library of values that is mapped to the discovered capabilities of the available network by invoking a command through an API (e.g., API 322 in FIG. 3) to expose the value. Similarly, one or more TCP/IP parameters (e.g., connect timeout, send timeout, and receive timeout) may be exposed via the API, as indicated in block 518. The API then propagates the selected parameter values to the TCP/IP layer as shown at block 525. The parameter values are used to manage a communication session between the local host and remote device that is performed over the network as shown at block 531. If the application switches a network connection, then the steps shown in FIG. 5 are repeated for each new network connection utilized. The illustrative method 500 ends at block 542.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method for enhancing data throughput from a client application, the method comprising:
   determining an availability of a link associated with one of a plurality of network types;
   selecting an HTTP connection retry timeout value, the HTTP connection retry timeout value being retrieved from a library of stored parameter values and being mapped to a particular type of the plurality of network types based upon the determined availability of a link;
   selecting one or more TCP/IP timeout values, each of the TCP/IP timeout values being retrieved from the library of stored parameter values, and each of the TCP/IP timeout values being mapped to the particular type in the plurality of network types based upon the determined availability of a link;
   propagating the selected HTTP connection retry timeout value and TCP/IP timeout value to a TCP/IP layer of a protocol stack using an application programming interface arranged as an intermediary between the client application and the TCP/IP layer, the application programming interface exposing the TCP/IP layer to the client application;
   applying the selected HTTP and TCP/IP timeout values to data transmission over the link during client application runtime using the client application, the applying being enabled by use of the application programming interface, and
   repeating each of the recited steps when the application switches a network connection.

2. The method of claim 1 in which the plurality of network types includes one of (a) a high-bandwidth network selected from one of Ethernet network or USB network, (b) a medium-bandwidth network including a wireless network conforming with IEEE 802.11, or (c) a low-bandwidth network selected from one of mobile data network or dial-up network.

3. The method of claim 2 in which the mobile data network is selected from one of GPRS, EDGE, HSDPA, or UMTS.

4. The method of claim 1 further including a step of manipulating an HTTP timeout value associated with a connection retry timeout.

5. The method of claim 2 in which the one or more TCP/IP timeout values are associated with one of send timeout, receive timeout, or connect timeout.

6. A system configured to increase data throughput, comprising:
   one or more processors;
   memory configured to:
   store one or more HTTP connection retry timeout values, the HTTP connection retry timeout values being mapped to a particular type of a plurality of network types; and
   store one or more sets of TCP/IP configuration parameters, each of the one or more sets of TCP/IP configuration parameters being associated with a respective network protocol operable on a network link; and
   one or more computer-readable storage media storing a client application and instructions which, in response to execution by the one or more processors, implement a configuration for the system to:
   propagate the HTTP connection retry timeout values and the TCP/IP configuration parameters to a TCP/IP layer of a protocol stack using an application programming interface arranged as an intermediary between the client application and the TCP/IP layer, the application programming interface configured to expose the TCP/IP layer to the client application;

expose TCP/IP configuration parameter control to the client application through the application programming interface, to enable the client application to apply a selected set of HTTP connection retry timeout values and TCP/IP configuration parameters to a communication session with a remote terminal over the network link, the applying being enabled by the use of the application programming interface; and re execute the stored instructions so that the system is reconfigured when the client application switches to a new network link.

7. The system of claim 6 in which the client application is arranged to run on a mobile host selected from one of mobile phone, PDA, smart phone, personal computer, pocket PC, laptop computer, tablet PC, portable media player, game console, or portable game device.

8. The system of claim 6 in which the client application is a database.

9. The system of claim 6 in which the remote terminal is a server.

10. The system of claim 6 in which the communication session is utilized attendant to data-synchronization or replication between the client application and a service operating on the remote terminal.

11. The system of claim 6 in which the network link is selected from one of USB link, local area network link, wireless link, or mobile network link.

12. A method for enabling communication link-awareness in an application operating in a mobile computing environment, the method comprising:

performing a query to ascertain a profile of a network, the network including a wireless link;

selecting an HTTP connection retry timeout value and a TCP/IP timeout value from a library of timeout values that is mapped to the profile, each value being greater than an average latency for data transmission over the wireless link; and propagating the selected timeout values to a TCP/IP layer in a protocol stack operating in the mobile computing environment, the timeout values propagated using an application programming interface, arranged as an intermediary between a client application and the TCP/IP layer, the application programming interface exposing the TCP/IP layer to the client application, wherein the selected timeout values are applied to data transmission over the wireless link during client application runtime using the client application, the application of the selected timeout values being enabled by use of the application programming interface, and wherein each of the recited steps is repeated when the application switches a network connection.

13. The method of claim 12 in which the profile is applicable to a specific one of a plurality of network types operable in the mobile computing environment, each network type being characterized by different bandwidth.

14. The method of claim 12 in which the propagating is enabled with an application programming interface that is arranged to expose the TCP/IP layer to the application.

15. The method of claim 14 in which the application is arranged for switching from a first network connection to a second network connection.

16. The method of claim 15 in which the timeout value is switched from a timeout value associated with a first network protocol to a timeout value associated with a second network protocol.

17. The method of claim 1 wherein the client application runs on a mobile host selected from one of mobile phone, PDA, smart phone, personal computer, pocket PC, laptop computer, tablet PC, portable media player, game console, or portable game device.

18. The method of claim 1 wherein the determining step further comprises performing a query to determine changes to network connectivity and capabilities.

19. The method of claim 1 wherein the determining step further comprises receiving a notification of changes to network connectivity and capabilities.

20. The method of claim 1 wherein the client application is arranged for switching from a first network connection to a second network connection.

* * * * *